(12) United States Patent
Wang et al.

(10) Patent No.: US 10,671,178 B2
(45) Date of Patent: Jun. 2, 2020

(54) KEYBOARD DEVICE AND SYSTEM OPERATION METHOD

(71) Applicant: Chicony Electronics Co., Ltd., New Taipei (TW)

(72) Inventors: Yi-Hung Wang, New Taipei (TW); Tzu-Chuan Liang, New Taipei (TW); Wei-Chih Cheng, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 61 days.

(21) Appl. No.: 15/953,507

(22) Filed: Apr. 16, 2018

(65) Prior Publication Data

US 2019/0121445 A1    Apr. 25, 2019

(30) Foreign Application Priority Data

Oct. 23, 2017  (TW) .............................. 106136384 A

(51) Int. Cl.
| | |
|---|---|
| *G06F 3/02* | (2006.01) |
| *G06F 1/16* | (2006.01) |
| *H04M 1/02* | (2006.01) |
| *H04M 1/725* | (2006.01) |
| *H04M 1/23* | (2006.01) |

(52) U.S. Cl.
CPC .......... *G06F 3/0208* (2013.01); *G06F 1/1632* (2013.01); *G06F 1/1669* (2013.01); *G06F 1/1675* (2013.01); *G06F 1/1677* (2013.01); *G06F 1/1683* (2013.01); *H04M 1/0254* (2013.01); *H04M 1/72527* (2013.01); *G06F 1/1626* (2013.01); *H04M 1/23* (2013.01)

(58) Field of Classification Search
CPC .... G06F 3/0208; G06F 1/1675; G06F 1/1669; G06F 1/1626
See application file for complete search history.

(56) References Cited

U.S. PATENT DOCUMENTS

| | | | |
|---|---|---|---|
| 7,327,560 B1 | 2/2008 | Tabasso et al. | |
| 8,880,754 B1* | 11/2014 | Grimme | G06F 1/1622 710/11 |
| 9,413,931 B2* | 8/2016 | Kuromatsu | G06F 1/1677 |
| 9,471,109 B1* | 10/2016 | Chng | G06F 1/1677 |
| 2003/0085870 A1* | 5/2003 | Hinckley | G06F 1/1626 345/156 |

(Continued)

FOREIGN PATENT DOCUMENTS

| | | |
|---|---|---|
| TW | M436364 U1 | 9/2012 |
| TW | M494469 U | 1/2015 |
| TW | M542165 U | 5/2017 |

*Primary Examiner* — Ibrahim A Khan
(74) *Attorney, Agent, or Firm* — CKC & Partners Co., LLC

(57) ABSTRACT

A keyboard device is applied to an electronic apparatus and includes a main body, a connection base, a first tilt sensor, a second tilt sensor, and a processor. The connection base is rotatably connected to the main body and configured to detachably be engaged to the electronic apparatus. The first tilt sensor is disposed on the main body and configured to generate first tilt data. The second tilt sensor is disposed on the connection base and configured to generate second tilt data. The processor is electrically connected to the first tilt sensor and the second tilt sensor, and is configured to calculate angle difference data according to the first tilt data and the second tilt data.

18 Claims, 7 Drawing Sheets

(56) References Cited

U.S. PATENT DOCUMENTS

| | | | | |
|---|---|---|---|---|
| 2006/0079277 | A1* | 4/2006 | Ditzik | G06F 1/1615 |
| | | | | 455/556.1 |
| 2007/0200775 | A1* | 8/2007 | Hirota | G06F 1/162 |
| | | | | 343/702 |
| 2009/0140890 | A1* | 6/2009 | Bao | G06F 3/023 |
| | | | | 341/26 |
| 2009/0144574 | A1* | 6/2009 | Tseng | G06F 1/1616 |
| | | | | 713/323 |
| 2010/0064536 | A1* | 3/2010 | Caskey | G06F 1/1616 |
| | | | | 33/303 |
| 2011/0179864 | A1* | 7/2011 | Raasch | G06F 1/1616 |
| | | | | 73/493 |
| 2013/0229354 | A1* | 9/2013 | Whitt, III | G06F 1/1618 |
| | | | | 345/169 |
| 2014/0002978 | A1* | 1/2014 | Ding | G06F 1/1667 |
| | | | | 361/679.11 |
| 2014/0101578 | A1* | 4/2014 | Kwak | G06F 3/04883 |
| | | | | 715/761 |
| 2014/0145959 | A1* | 5/2014 | Hatakeyama | G06F 1/1643 |
| | | | | 345/168 |
| 2014/0340840 | A1* | 11/2014 | Han | G06F 1/1632 |
| | | | | 361/679.43 |
| 2015/0062525 | A1* | 3/2015 | Hirakata | G06F 1/1641 |
| | | | | 349/158 |
| 2015/0095683 | A1* | 4/2015 | Kitatani | H04M 1/67 |
| | | | | 713/323 |
| 2015/0154737 | A1* | 6/2015 | McRae | G06F 3/017 |
| | | | | 345/652 |
| 2015/0268694 | A1 | 9/2015 | Hiratomo et al. | |
| 2015/0331455 | A1* | 11/2015 | Jung | G06F 1/1626 |
| | | | | 361/679.29 |
| 2016/0179137 | A1* | 6/2016 | Bendiscioli | G06F 1/1616 |
| | | | | 73/493 |
| 2016/0246332 | A1* | 8/2016 | Deng | G06F 1/1632 |
| 2016/0275648 | A1* | 9/2016 | Honda | G06F 3/16 |
| 2018/0013221 | A1* | 1/2018 | Castell | G06F 1/1632 |
| 2018/0254132 | A1* | 9/2018 | Cummings | H01F 7/0252 |

* cited by examiner

KEYBOARD DEVICE AND SYSTEM OPERATION METHOD

RELATED APPLICATIONS

This application claims priority to Taiwan Application Serial Number 106136384, filed Oct. 23, 2017, which is herein incorporated by reference.

BACKGROUND

Technical Field

The present disclosure relates to a keyboard device and a system operation method.

Description of Related Art

Detachable 2-in-1 laptops not only have the thin features of tablet PCs, but also have the practicality of traditional laptops, because the detachable 2-in-1 laptops have been equipped with keyboards that are detachable and can rotate to match the tilt angle of the tablet PC. When the tablet PC is connected from the keyboard, the tablet PC will detect the angle between the PC and the keyboard, and switch into different working state accordingly. For example, when the angle becomes less than 15 degrees, the tablet PC will enter the sleeping mode and turn off the function of the keyboard to save electricity. When the angle becomes greater than 180 degrees, the tablet PC will enter the displaying mode and turn off the function of the keyboard to avoid user touching the keyboard or touchpad accidently.

However, to obtain the angle between the tablet PC and the keyboard, the data detected by the sensor has to be read frequently and then transmitted to the tablet PC for instant computing. This will cause high electricity consumption and high design complexity, and may reduce the battery life of the tablet PC.

Accordingly, how to provide a system to solve the mentioned problems becomes an important issue to be solved by those in the industry.

SUMMARY

Accordingly, an aspect of the disclosure is to provide a keyboard device and a system operation method that can effectively reduce the complexity of the system designing and the electricity consumption.

To achieve the above-mentioned purposes, according to an embodiment of the disclosure, a keyboard device is applied to an electronic apparatus. The keyboard device includes a main body, a connection base, a first tilt sensor, a second tilt sensor, and a processor. The connection base is rotatably connected to the main body and configured to detachably be engaged to the electronic apparatus. The first tilt sensor is disposed on the main body and configured to generate first tilt data. The second tilt sensor is disposed on the connection base and configured to generate second tilt data. The processor is electrically connected to the first tilt sensor and the second tilt sensor and configured to calculate angle difference data according to the first tilt data and the second tilt data.

In an embodiment of the disclosure, the connection base is configured to abut the electronic apparatus with an abutting surface. The keyboard device further includes an electrical connector. The electrical connector is disposed on the connection base, partially exposed from the abutting surface, and electrically connected to the processor.

In an embodiment of the disclosure, the processor is configured to calculate the angle difference data when the electrical connector receives an electrical signal from the electronic apparatus.

In an embodiment of the disclosure, the keyboard device further includes a Hall effect sensor. The Hall effect sensor is disposed on the connection base and electrically connected to the processor. The processor is configured to calculate the angle difference data when the Hall effect sensor receives a magnetic signal from the electronic apparatus.

In an embodiment of the disclosure, the keyboard device further includes a Hall effect sensor. The Hall effect sensor is disposed on the connection base and electrically connected to the processor. The processor is configured to calculate the angle difference data when the electrical connector and the Hall effect sensor respectively receive an electrical signal and a magnetic signal from the electronic apparatus.

In an embodiment of the disclosure, the connection base includes two extended portions. The extended portions are extended from the abutting surface and form a trough with the abutting surface. The trough is configured to accommodate a part of the electronic apparatus when the connection base is engaged to the electronic apparatus.

In an embodiment of the disclosure, the main body is pivotally connected to the connection base.

In an embodiment of the disclosure, the keyboard device further includes a flexible structure. The flexible structure is connected between the main body and the connection base. The processor is disposed on the main body. The second tilt sensor is electrically connected to the processor through the flexible structure.

In an embodiment of the disclosure, at least one of the first tilt sensor and the second tilt sensor is an acceleration sensor.

To achieve the above-mentioned purposes, in another embodiment of the disclosure, a system operation method is applied to an electronic apparatus and a keyboard device. The keyboard device includes a main body, a connection base rotatably connected to the main body, a first tilt sensor disposed on the main body, a second tilt sensor disposed on the connection base, and a processor electrically connected to the first tilt sensor and the second tilt sensor. The system operation method includes the steps of: generating first tilt data and second tilt data respectively by the first tilt sensor and the second tilt sensor; driving the processor to calculate angle difference data according to the first tilt data and the second tilt data; and transmitting the angle difference data to the electronic apparatus.

In an embodiment of the disclosure, the connection base is configured to abut the electronic apparatus with an abutting surface. The keyboard device further includes an electrical connector. The electrical connector is disposed on the connection base, partially exposed from the abutting surface, and electrically connected to the processor. The step of driving the processor includes: driving the processor to calculate the angle difference data when the electrical connector receives an electrical signal from the electronic apparatus.

In an embodiment of the disclosure, the keyboard device further includes a Hall effect sensor. The Hall effect sensor is disposed on the connection base and electrically connected to the processor. The step of driving the processor includes: driving the processor to calculate the angle difference data when the electrical connector and the Hall effect sensor respectively receives an electrical signal and a magnetic signal from the electronic apparatus.

In an embodiment of the disclosure, the keyboard device further includes a matrix scanning circuit. The matrix scanning circuit is disposed on the main body and electrically connected to the processor. The system operation method further includes: driving the processor to transfer a trigger signal generated by the matrix scanning circuit into an input signal.

In an embodiment of the disclosure, the system operation method further includes: driving the electronic apparatus to determine whether to operate based on the input signal according to the angle difference data.

In an embodiment of the disclosure, the keyboard device further includes a matrix scanning circuit. The matrix scanning circuit is disposed on the main body and electrically connected to the processor. The system operation method further includes: driving the processor to determine whether to drive the matrix scanning circuit to perform a scanning operation according to the angle difference data.

In an embodiment of the disclosure, the keyboard device further includes a matrix scanning circuit. The matrix scanning circuit is disposed on the main body and electrically connected to the processor. The system operation method further includes: driving the processor to determine whether to transfer a triggered signal generated by the matrix scanning circuit into an input signal according to the angle difference data.

Accordingly, in the keyboard device of the present disclosure, the two tilt sensors are disposed on the main body and the connection base respectively. When the connection base is engaged to the electronic apparatus, the tilt sensor in the connection base is able to reflect the tilt status of the electronic apparatus. Also, in the system operation method of the present disclosure, only when the connection base is connected to the electronic apparatus, the processor disposed in the main body is driven to calculate the angle difference data according the tilt data generated by the two tilt sensors, and the angle difference data is transmitted to the electronic apparatus to be determined. Therefore, under the structure of the keyboard device of the present disclosure cooperating with the operations of the system operation method of the present disclosure, the complexity of the system design (i.e., the combination of the keyboard device and the electronic apparatus) and the electricity consumption can be effectively reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
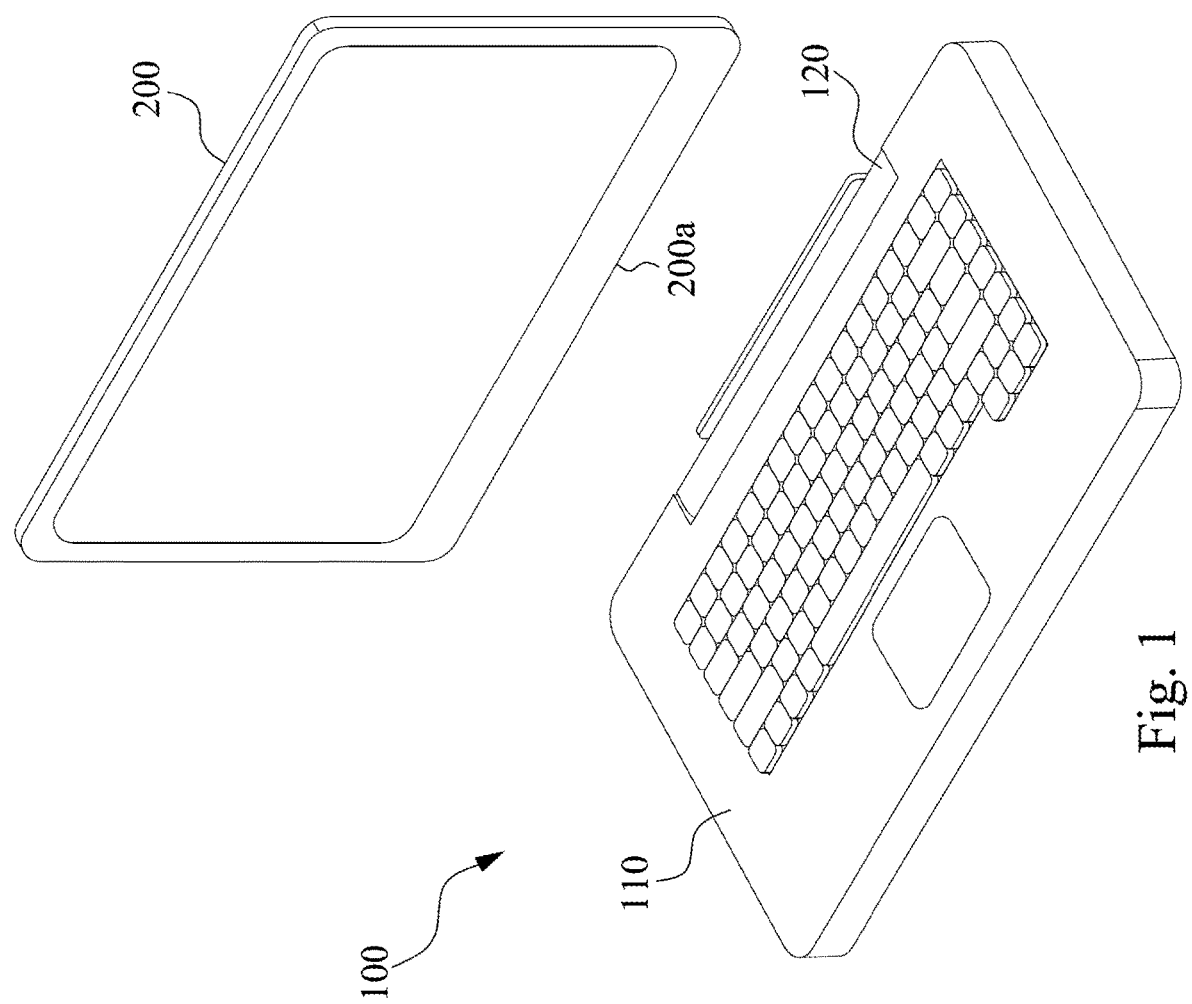
FIG. 1 is a perspective view of a keyboard device and an electronic apparatus according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
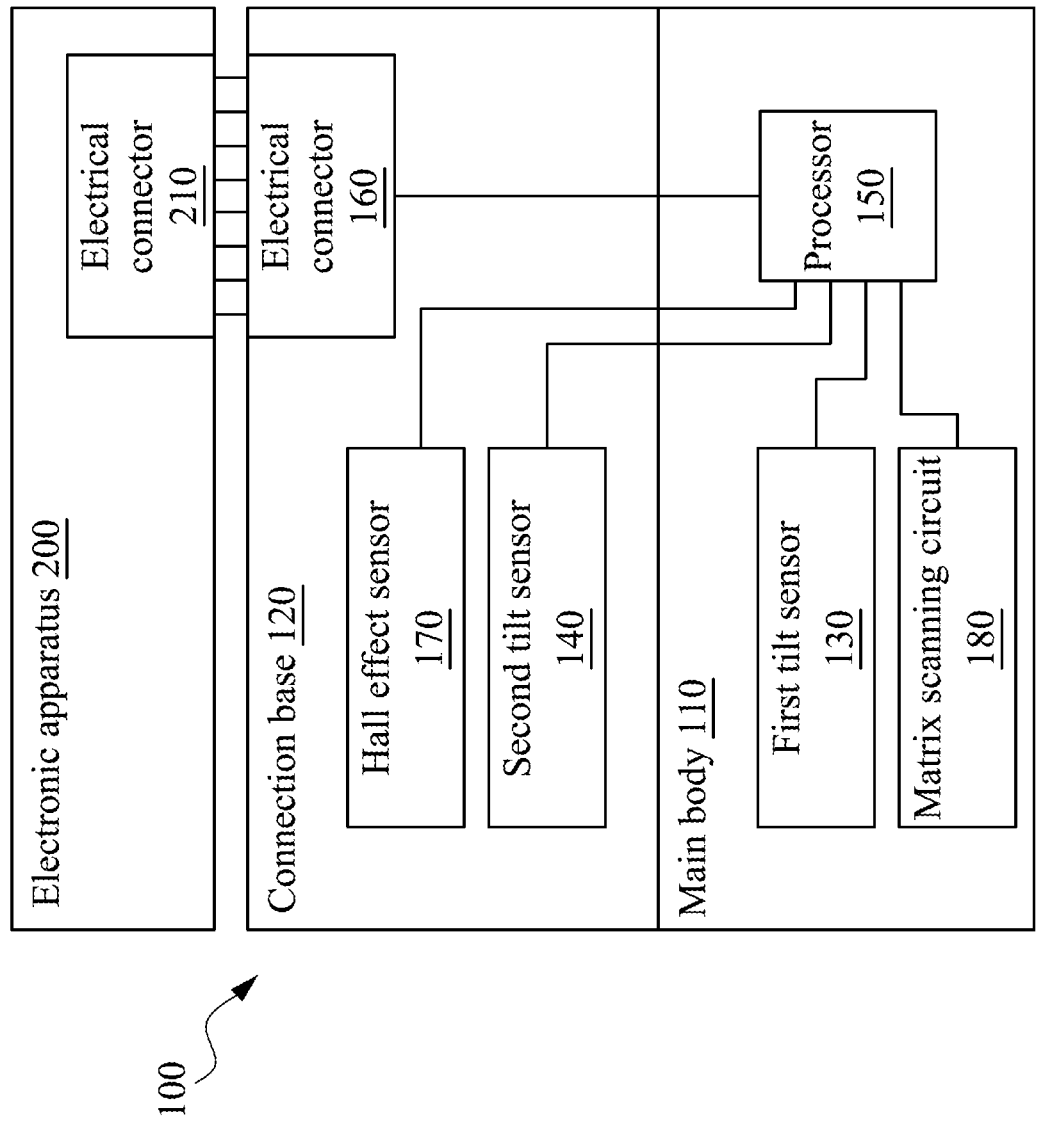
FIG. 2 is a functional block diagram of the keyboard device and the electronic apparatus shown in FIG. 1.

Reference is made to FIG. 1 and FIG. 2. FIG. 1 is a perspective view of a keyboard device 100 and an electronic apparatus 200 according to an embodiment of the disclosure. FIG. 2 is a functional block diagram of the keyboard device 100 and the electronic apparatus 200 shown in FIG. 1. As shown in FIG. 1 and FIG. 2, in this embodiment, the keyboard device 100 is suitable to be used with the electronic apparatus 200. An example of the electronic apparatus 200 of this embodiment is a tablet PC, so that the combination of the keyboard device 100 and the electronic apparatus 200 forms a 2-in-1 PC system, and the disclosure is not limited in this regard. The structures and functions of components included in the keyboard device 100 and the connection and action relationships among the components are introduced below.

As shown in FIG. 1 and FIG. 2, in this embodiment, the keyboard device 100 includes a main body 110, a connection base 120, a first tilt sensor 130, a second tilt sensor 140, and a processor 150. The connection base 120 is rotatably connected to the main body 110 and configured to detachably be engaged to the electronic apparatus 200. The first tilt sensor 130 is disposed on the main body 110 and configured to generate first tilt data. The second tilt sensor 140 is disposed on the connection base 120 and configured to generate second tilt data. The processor 150 is electrically connected to the first tilt sensor 130 and the second tilt sensor 140, and is configured to calculate angle difference data according to the first tilt data and the second tilt data. In this embodiment, the processor 150 is disposed on the main body 110.

In some embodiments, both the first tilt sensor 130 and the second tilt sensor 140 are accelerometer-sensor (i.e. G-sensor), so the first tilt data and the second tilt data generated by the first tilt sensor 130 and the second tilt sensor 140 respectively are 3-vector values in three-dimensional space. For example, the first tilt data is $\vec{a}=(a_1,a_2,a_3)$, the second tilt data is $\vec{b}=(b_1,b_2,b_3)$. Therefore, the processor 150 disposed on the main body 110 can obtain the angle difference data by calculating the inner product of the space vectors. Specifically, the processor 150 disposed on the main body 110 can obtain the angle θ between the vector $\vec{a}$ and $\vec{b}$ by calculating the inner product of the space vectors. In detail, the angle θ can be calculated by the following formula.

$$\cos\theta = \frac{\vec{a}\cdot\vec{b}}{|\vec{a}||\vec{b}|} = \frac{a_1b_1 + a_2b_2 + a_3b_3}{\sqrt{a_1^2+a_2^2+a_3^2}\sqrt{b_1^2+b_2^2+b_3^2}} \qquad (1)$$

It should be pointed out that when the connection base 120 and the electronic apparatus 200 are stably engaged to each other, the connection base 120 and the electronic apparatus 200 can act as a single structure and rotate relative to the keyboard device 100. Therefore, the second tilt data generated by the second tilt sensor 140 disposed on the connection base 120 can represent the tilt status of the electronic apparatus 200 relative to the keyboard device 100.

In applications, when the connection base 120 and the electronic apparatus 200 are engaged to each other, the angle difference data calculated according to the first tilt data and the second tilt data can represent the tilt status of the electronic apparatus 200 relative to the keyboard device 100 by way of mapping using a lookup table. For example, when the connection base 120 and the electronic apparatus 200 are engaged to each other, the angle difference data as the electronic apparatus 200 covers on the keyboard device 100 and the angle difference data as the electronic apparatus 200 rotates to a certain angle relative to the keyboard device 100, can be recorded in the form of a lookup table.

In some embodiments, the processor 150 disposed on the main body 110 is a low-power ARM (Advanced RISC Machine) micro processing unit. The angle difference data that can represent the tilt status of electronic apparatus 200 relative to the keyboard device 100 is calculated by the low-power processor 150 disposed on the keyboard device 100, rather than by the central processing unit inside the electronic apparatus 200, so as to reduce the complexity of the system design (i.e., the combination of the electronic apparatus 200 and the keyboard device 100) and the electricity consumption.

Figure 3A:
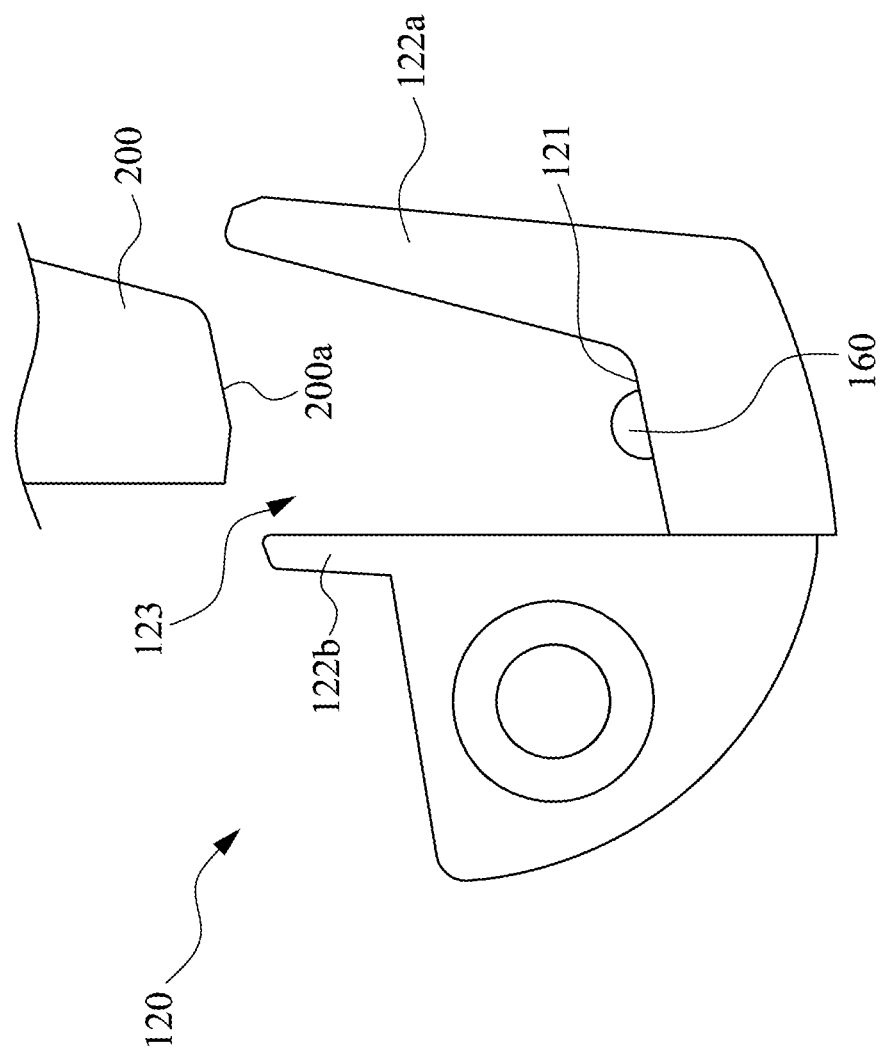
FIG. 3A is a partial side view of the connection base and the electronic apparatus shown in FIG. 1, in which the connection base is detached from the electronic apparatus.
Figure 3B:
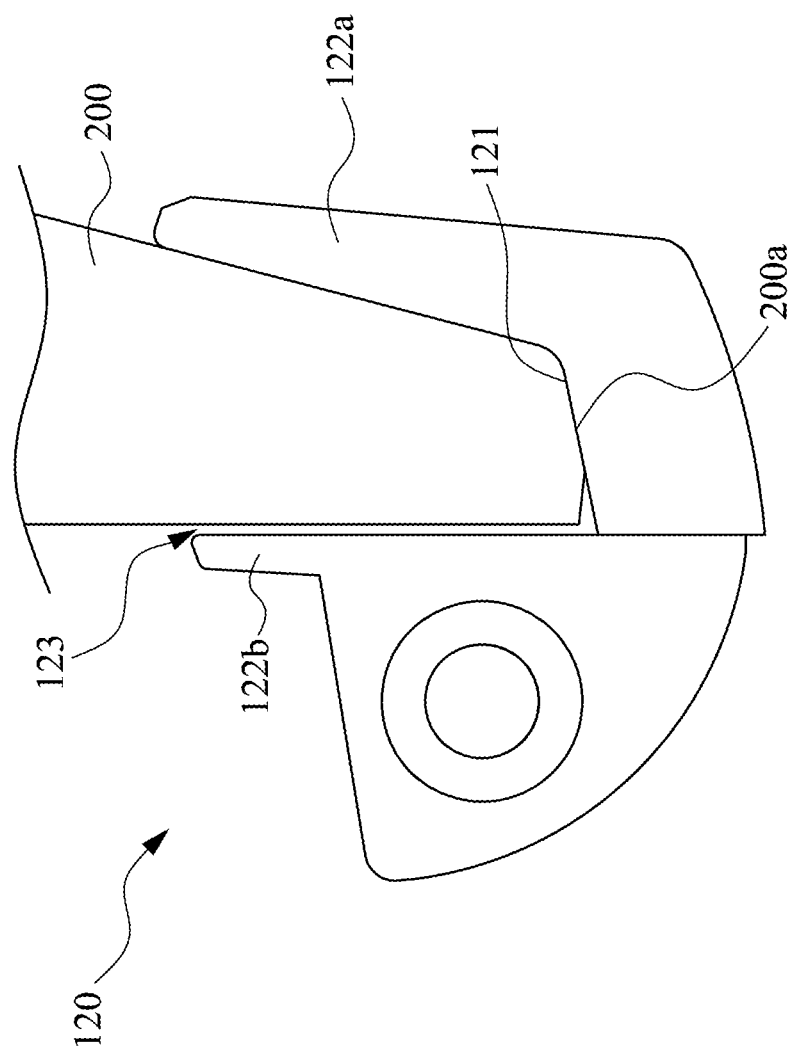
FIG. 3B is another partial side view of the structure shown in FIG. 3A, in which the connection base is engaged to the electronic apparatus.

Reference is made to FIG. 3A and FIG. 3B. FIG. 3A is a partial side view of the connection base 120 and the electronic apparatus 200 in FIG. 1, in which the connection base 120 is detached from the electronic apparatus 200. FIG. 3B is another side view of the structure in FIG. 3A, in which the connection base 120 is engaged to the electronic apparatus 200. As shown in FIG. 3A and FIG. 3B, in this embodiment, the connection base 120 is configured to abut against the electronic apparatus 200 with an abutting surface 121. The main body 110 further includes an electrical connector 160. The electrical connector 160 is disposed on the connection base 120, partially exposed from the abutting surface 121, and electrically connected to the processor 150. When the connection base 120 is engaged to the electronic apparatus 200, the electrical connector 160 on the connection base 120 is able to be coupled with an electrical connector 210 (referring to FIG. 2) on the electronic apparatus 200, so to transmit an electrical signal.

As shown in FIG. 3A and FIG. 3B, in this embodiment, the connection base 120 is configured to abut against a side edge 200a of the electronic apparatus 200 with the abutting surface 121. Through making the connection base 120 be detachably abut against the side edge 200a of the electronic apparatus 200, the second tilt sensor 140 disposed on the connection base 120 and the side edge 200a of the electronic apparatus 200 can be ensured to be in the same tilt status, and the tilt status of the side edge 200a can represent the tilt status of the whole electronic apparatus 200.

In some embodiments, the processor 150 disposed on the main body 110 is further configured to calculate the above-mentioned angle difference data when the electrical connector 160 receives the electrical signal from the electronic apparatus 200. For example, the above-mentioned electrical signal is electric power that the electronic apparatus 200 transmits to the processor 150 through the electrical connector 160. That is, the processor 150 disposed on the main body 110 will start to calculate the angle difference data only when the electric power supplied by the electronic apparatus 200 is received.

In some embodiments, magnetic components (not shown) are disposed on the connection base 120 and the electronic apparatus 200 respectively to attract one another when the connection base 120 and the electronic apparatus 200 are engaged, so as to increase the fixing stability between the connection base 120 and the electronic apparatus 200 and ensure that the second tilt sensor 140 and the electronic apparatus 200 are in the same tilt status. In some embodiments, magnetic components (not shown) are disposed on the connection base 120 and electronic apparatus 200 respectively to attract one another when the connection base 120 is engaged to the electronic apparatus 200, so as to increase the coupling stability of the electrical connector 160 disposed on the connection base 120 and the electrical connector 210 disposed on the electronic apparatus 200 and maintain the stability of transmitting the electrical signal.

In addition, in this embodiment, the keyboard device 100 further includes a Hall effect sensor 170. The Hall effect sensor is disposed on the connection base 120 and electrically connected to the processor 150. The Hall effect sensor 170 is configured to sense a magnetic signal generated by the magnetic components respectively disposed on the connection base 120 and the electronic apparatus 200 while attracting one another.

In some embodiments, the processor 150 disposed on the main body 110 is further configured to calculate the angle difference data when the Hall effect sensor 170 receives the magnetic signal. In some embodiments, the processor 150 disposed on the main body 110 is further configured to calculate the angle difference data when the electrical connector 160 and the Hall effect sensor 170 respectively receive the electrical signal and the magnetic signal from the electronic apparatus 200. For example, the processor 150 disposed on the main body 110 will start to calculate the angle difference data only when the processor 150 receives electric power from the electronic apparatus 200 and also the Hall effect sensor 170 receives the above-mentioned magnetic signal. As a result, it can be ensured that the whole system (including the keyboard device 100 and the electronic apparatus 200) will not increase power consumption.

In specific applications, the electronic apparatus 200 can switch to different working modes according to the above-mentioned angle difference data. For example, when the angle difference data shows the angle difference is less than 15 degrees, the electronic apparatus 200 will switch to the sleep mode; when the angle difference data shows the angle difference is ranged from 15 degrees to 180 degrees, the electronic apparatus 200 will switch to the laptop mode; and when the angle difference data shows the angle difference is greater than 180 degrees, the electronic apparatus 200 will switch to the tablet PC mode, but the disclosure is not limited in this regard.

As shown in FIG. 2, in this embodiment, the keyboard device 100 further includes a matrix scanning circuit 180. The matrix scanning circuit 180 is disposed on the main body 110 and electrically connected to the processor 150. The processor 150 disposed on the main body 110 is configured to transfer a trigger signal generated by the matrix scanning circuit 180 into an input signal.

In some embodiments, the processor 150 is also able to determine whether to transfer the trigger signal generated by the matrix scanning circuit 180 into the input signal according to the angle difference data. For example, when the angle difference data shows the angle difference is ranged from 150 degrees to 165 degrees, although the keyboard device 100 has not been switched to the sleep mode yet, and the matrix scanning circuit 180 still operates normally; according to the angle difference data which shows the angle difference is ranged from 150 degrees to 165 degrees, the processor 150 does not transfer the trigger signals generated in accordance with most of the alphabet keys of the keyboard device 100 into input signals, but transfers the trigger signals generated in accordance with the windows key, the blank key, or the function keys into the input signals.

In some embodiments, the processor is also able to determine whether to drive the matrix scanning circuit 180 to operate according to the angle difference data. For example, when the angle difference data shows the angle difference is greater than 165 degrees but less than 180 degrees, although the keyboard device 100 has not been switched to the sleep mode yet, the processor 150 will not drive the matrix scanning circuit 180 to perform the scanning operation and thus does not generate trigger signals, but the processor 150 still drives the other components of the keyboard device 100 (such as the touchpad) to operate normally.

In specific applications, the electronic apparatus 200 will be able to determine whether to operate based on the input signal according to the angle difference data. For example, when the angle difference data shows the angle difference is less than 15 degrees or greater than 180 degrees, the electronic apparatus 200 will not operate based on the input signal; and when the angle difference data shows the angle difference is ranged from 15 degrees to 180 degree, the electronic apparatus 200 will operate based on the input signal, but the disclosure is not limited in this regard.

In some embodiments, the electrical connector 160 disposed on the connection base 120 is a Pogo pin connector, but the disclosure is not limited in this regard.

As shown in FIG. 3A and FIG. 3B, in this embodiment, the connection base 120 includes two extended portions 122A and 122B. The extended portions 122A and 122B are extended from the abutting surface 121 and form a trough 123 with the abutting surface 121. The trough 123 is configured to accommodate a part of the electronic apparatus 200 when the connection base 120 is engaged to the electronic apparatus 200. Therefore, when a user holds and rotates the electronic apparatus 200 relative to the main body 110, it can be ensured that the electronic apparatus 200 will not be detached apart from the connection base 120 easily.

As shown in FIG. 1, FIG. 3A, and FIG. 3B, in this embodiment, the main body 110 is pivotally connected to the connection base 120 (e.g., through a hinge), but the disclosure is not limited in this regard.

Figure 4A:
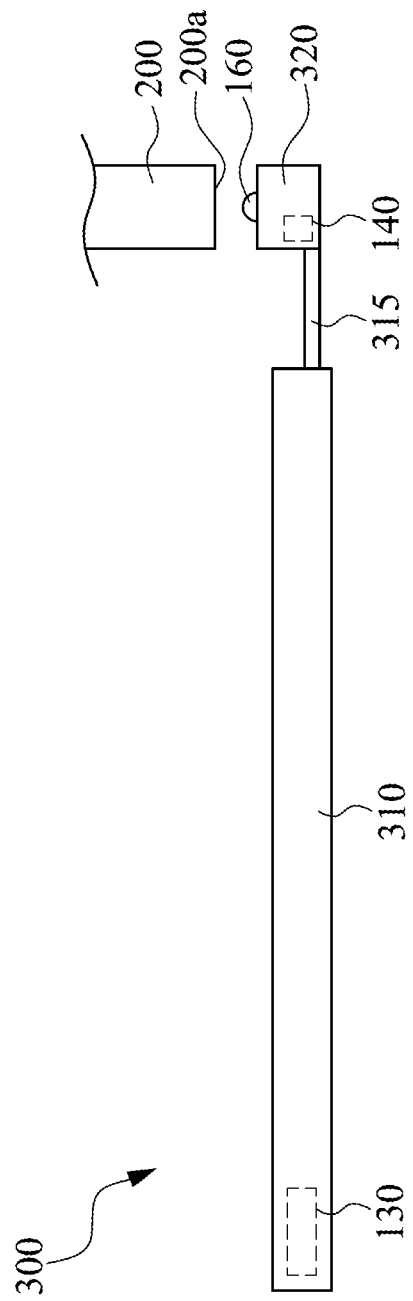
FIG. 4A is an exploded side view of a keyboard device and an electronic apparatus according to another embodiment of the disclosure.
Figure 4B:
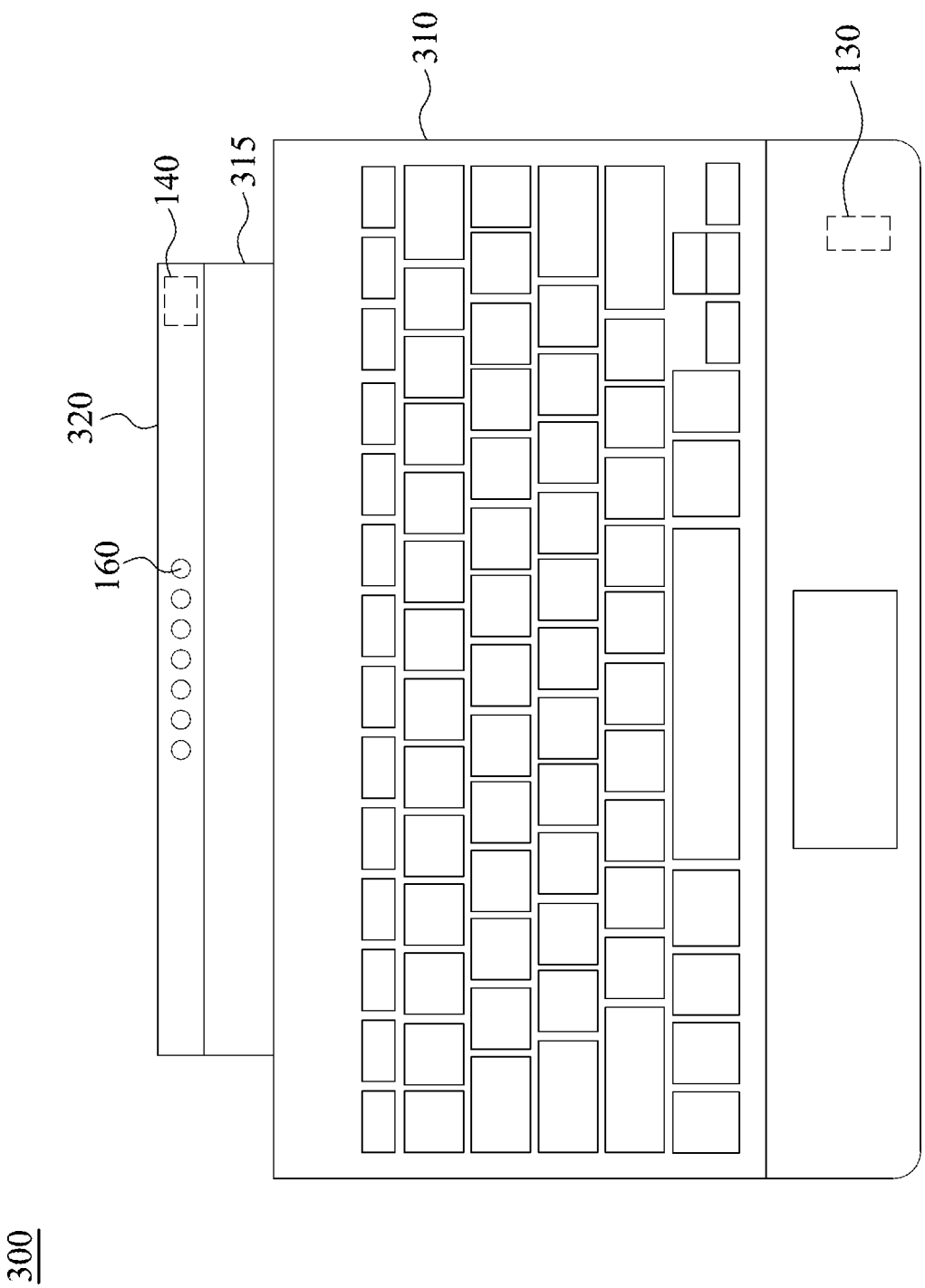
FIG. 4B is the top view of the keyboard device shown in FIG. 4A.

Reference is made to FIG. 4A and FIG. 4B. FIG. 4A shows the exploded side view of a keyboard device 300 and the electronic apparatus 200 according to another embodiment of the disclosure. FIG. 4B shows the top view of the keyboard device 300 in FIG. 4A. As shown in FIG. 4A and FIG. 4B, in this embodiment, the keyboard device 300 includes a main body 310 and a connection base 320, and also includes the first tilt sensor 130, the second tilt sensor 140, the processor 150, the electrical connector 160, the Hall effect sensor 170, and the matrix scanning circuit 180. It should be pointed out that the difference between this embodiment and the embodiment shown in FIG. 1 is that this embodiment provides modifications on the main body 310 and the connection base 320 of the keyboard device 300.

Specifically, in this embodiment, the keyboard device 300 further includes a flexible structure 315. The flexible structure 315 is connected between the main body 310 and the connection base 320. The main body 310 is rotatably connected to the main body 310 through the flexible structure 315. The second tilt sensor 140 and the Hall effect sensor 170 are electrically connected to the processor 150 through the flexible structure 315 (e.g., the wires connecting the second tilt sensor 140 or the Hall effect sensor 170 to the processor 150 is embedded in the flexible structure 315).

In some embodiments, the above-mentioned flexible structure 315 can be formed of a textile fiber layer, a leather layer, a plastic layer, or a net layer.

In some embodiments, the flexible structure 315 can cover a portion of the outer surface of the main body 310, so as to increase the texture and the durability of the keyboard device 300.

Figure 5:
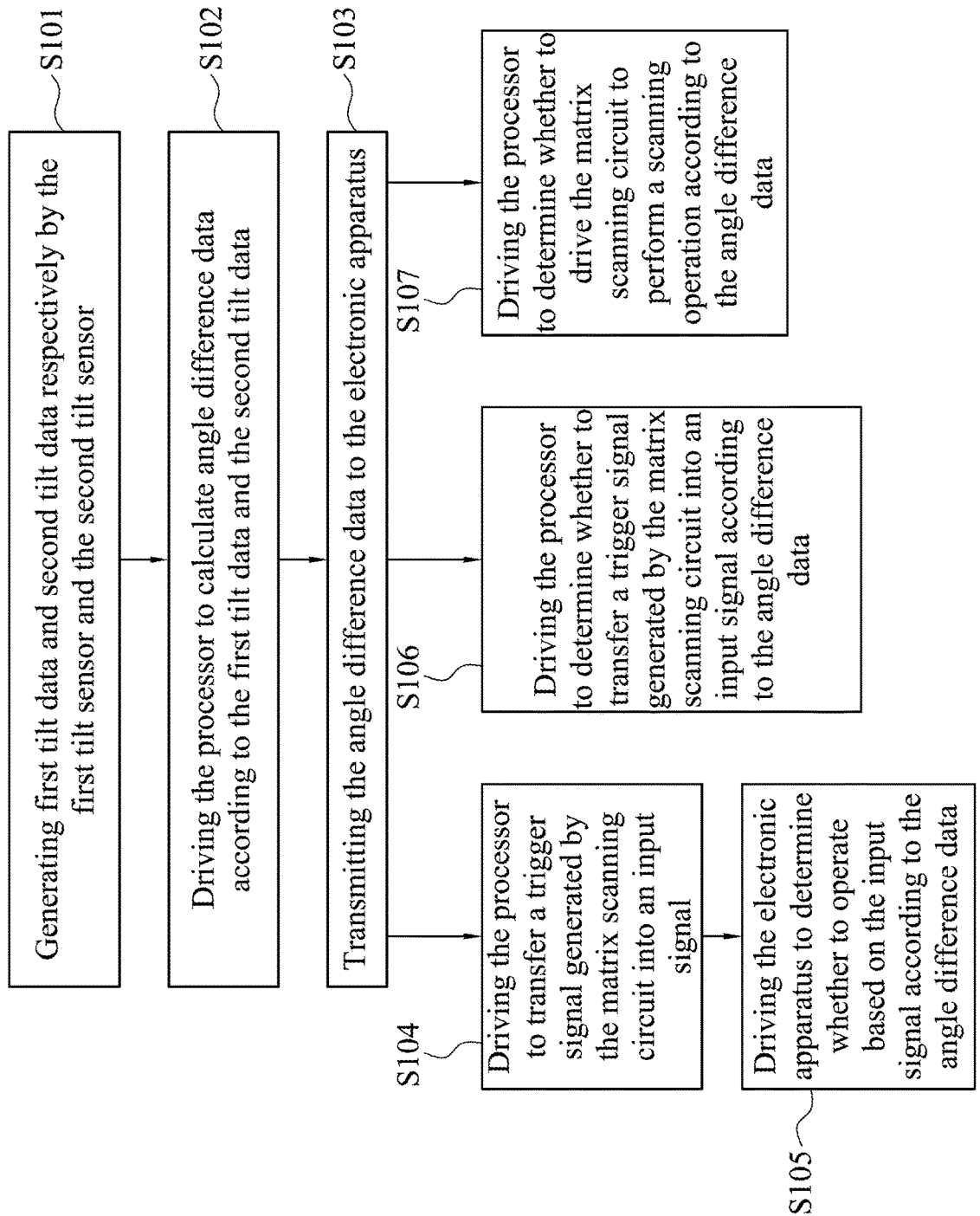
FIG. 5 is a flow chart of a system operation method according to an embodiment of the disclosure.

Reference is made to FIG. 5. FIG. 5 shows a flow chart of a system operation method according to an embodiment of the disclosure. The system operation method can be applied to the electronic apparatus 200 and the keyboard device 100 shown in FIG. 1 to FIG. 3B. The keyboard device 100 includes the main body 110, the connection base 120 rotatably connected to the main body 110, the first tilt sensor 130 and the processor 150 disposed on the main body 110, and the second tilt sensor 140 disposed on the connection base 120. The system operation method mainly includes step S101 to step S103.

In step S101, the first tilt sensor 130 and the second tilt sensor 140 are used to generate first tilt data and second tilt data respectively.

In step S102, the processor 150 is driven to calculate angle difference data according to the first tilt data and the second tilt data.

In step S103, the angle difference data is transmitted to the electronic apparatus 200.

In some embodiments, as shown in FIG. 1 to FIG. 3B, the electrical connector 160 of the keyboard device 100 is disposed on the connection base 120, partially exposed from the abutting surface 121 of the connection base 120, and electrically connected to the processor 150. The above-mentioned step S103 can further include step S103a.

In step S103a, when the electrical connector 160 receives the electrical signal from the electronic apparatus 200, the processor 150 is driven to calculate the angle difference data. For example, the processor 150 disposed on the main body 110 will start to calculate the angle difference data only when the processor 150 receives the electric power from the electronic apparatus 200.

In some embodiments, as shown in FIG. 2, the Hall effect sensor 170 is disposed on the connection base 120 and electrically connected to the processor 150. The above-mentioned step S103 can further include step S103b.

In step S103b, the processor 150 disposed on the main body 110 is driven to calculate the angle difference data when the electrical connector 160 and the Hall effect sensor 170 respectively receive the electrical signal and the magnetic signal from the electronic apparatus 200. For example, the processor 150 disposed on the main body 110 will start to calculate the angle difference data only when the processor 150 receives the electric power from the electronic apparatus 200 and also the Hall effect sensor 170 receives the magnetic signal. Therefore, it can be ensured that the whole system (including the keyboard device 100 and the electronic apparatus 200) will not increase power consumption.

In some embodiments, as shown in FIG. 2, the matrix scanning circuit 180 is disposed on the main body 110 and electrically connected to the processor 150. The system operation method further includes step S104, step S105, step S106, and step S107.

In step S104, the processor 150 is driven to transfer the trigger signal generated by the matrix scanning circuit 180 into an input signal.

In step S105, the electronic apparatus 200 is driven to determine whether to operate based on the input signal according to the angle difference data.

For example, when the angle difference data shows the angle difference is less than 15 degrees or greater than 180 degrees, the electronic apparatus 200 will not operate based on the input signal; and when the angle difference data shows the angle difference is ranged from 15 degrees to 180 degrees, the electronic apparatus 200 will operate based on the input signal, but the disclosure is not limited in this regard.

In step S106, the processor 150 is driven to determine whether to transfer the trigger signal generated by the matrix scanning circuit 180 into an input signal according to the angle difference data.

For example, when the angle difference data shows the angle difference is ranged from 150 degrees to 165 degrees, although the keyboard device 100 has not been switched to the sleep mode yet, and the matrix scanning circuit 180 still operates normally; according to the angle difference data which shows the angle difference is ranged from 150 degrees to 165 degrees, the processor 150 does not transfer the trigger signals generated in accordance with most of the alphabet keys of the keyboard device 100 into input signals, but transfers the trigger signals generated in accordance with the windows key, the blank key, or the function keys into the input signals.

In step S107, the processor 150 is driven to determine whether to drive the matrix scanning circuit 180 to perform a scanning process according to the angle difference data.

For example, when the angle difference data shows the angle difference is greater than 165 degrees but less than 180 degrees, although the keyboard device 100 has not been switched to the sleep mode yet, the processor 150 will not drive the matrix scanning circuit 180 to perform the scanning operation and thus does not generate trigger signals, but the processor 150 still drives the other components of the keyboard device 100 (such as the touchpad) to operate normally.

According to the foregoing recitations of the embodiments of the disclosure, it can be seen that in the keyboard device of the present disclosure, the two tilt sensors are disposed on the main body and the connection base respectively. When the connection base is engaged to the electronic apparatus, the tilt sensor in the connection base is able to exactly reflect the tilt status of the electronic apparatus. Also, in the system operation method of the present disclosure, only when the connection base is connected to the electronic apparatus, the processor disposed in the main body is driven to calculate the angle difference data according the tilt data generated by the two tilt sensors, and the angle difference data is transmitted to the electronic apparatus to be determined. Therefore, under the structure of the keyboard device of the present disclosure cooperating with the operations of the system operation method of the present disclosure, the complexity of the system design (i.e., the combination of the keyboard device and the electronic apparatus) and the electricity consumption can be effectively reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A keyboard device applied to an electronic apparatus, the keyboard device comprising:
    a main body comprising a plurality of keys, wherein the keys comprises a group;
    a matrix scanning circuit coupled to the keys and configured to generate a trigger signal;
    a connection base rotatably connected to the main body and configured to detachably be engaged to the electronic apparatus;
    a first tilt sensor disposed on the main body and configured to generate first tilt data;
    a second tilt sensor disposed on the connection base and configured to generate a second tilt data; and
    a processor electrically connected to the matrix scanning circuit, the first tilt sensor and the second tilt sensor and configured to calculate angle difference data according to the first tilt data and the second tilt data, so as to transfer the trigger signal into an input signal,
    wherein when the angle difference data shows an angle difference is within a predetermined range, the processor transfers the trigger signal if the trigger signal is generated by scanning the keys in the group using the matrix scanning circuit, and the processor does not transfer the trigger signal if the trigger signal is generated by scanning the keys outside the group using the matrix scanning circuit.

2. The keyboard device of claim 1, wherein the connection base is configured to abut the electronic apparatus with an abutting surface, the keyboard device further comprises an electrical connector, and the electrical connector is disposed on the connection base, partially exposed from the abutting surface, and electrically connected to the processor.

3. The keyboard device of claim 2, wherein the processor is configured to calculate the angle difference data when the electrical connector receives an electrical signal from the electronic apparatus.

4. The keyboard device of claim 2, further comprising a Hall effect sensor, the Hall effect sensor being disposed on the connection base and electrically connected to the processor, wherein the processor is configured to calculate the angle difference data when the Hall effect sensor receives a magnetic signal.

5. The keyboard device of claim 2, further comprising a Hall effect sensor, the Hall effect sensor being disposed on the connection base and electrically connected to the processor, wherein the processor is configured to calculate the angle difference data when the electrical connector and the Hall effect sensor respectively receive an electrical signal and a magnetic signal.

6. The keyboard device of claim 2, wherein the connection base comprises two extended portions, the extended portions are extended from the abutting surface and form a trough with the abutting surface, the trough is configured to accommodate a part of the electronic apparatus when the connection base is engaged to the electronic apparatus.

7. The keyboard device of claim 1, wherein the main body is pivotally connected to the connection base.

8. The keyboard device of claim 1, further comprising a flexible structure, the flexible structure is connected between the main body and the connection base, wherein the processor is disposed on the main body, and the second tilt sensor is electrically connected to the processor through the flexible structure.

9. The keyboard device of claim 1, wherein at least one of the first tilt sensor and the second tilt sensor is an acceleration sensor.

10. The keyboard device of claim 1, wherein the predetermined range is ranged from 150 degrees to 165 degrees.

11. The keyboard device of claim 1, wherein the group comprises a windows key, a blank key, and function keys.

12. A system operation method applied to an electronic apparatus and a keyboard device, the keyboard device comprising a main body, a matrix scanning circuit, a connection base rotatably connected to the main body, a first tilt sensor disposed on the main body, a second tilt sensor disposed on the connection base, and a processor electrically connected to the a matrix scanning circuit, the first tilt sensor and the second tilt sensor, the main body comprising a plurality of keys, the keys comprising a group, the matrix scanning circuit coupled to the keys, the system operation method comprising the steps of:

generating first tilt data and second tilt data respectively by the first tilt sensor and the second tilt sensor;

driving the processor to calculate angle difference data according to the first tilt data and the second tilt data;

driving the matrix scanning circuit to perform a scanning operation to generate a trigger signal;

driving the process to transfer the trigger signal into an input signal if the angle difference data shows an angle difference is within a predetermined range and the trigger signal is generated by scanning the keys in the group using the matrix scanning circuit;

not driving the process to transfer the trigger signal if the angle difference data shows the angle difference is within the predetermined range and the trigger signal is generated by scanning the keys outside the group using the matrix scanning circuit; and transmitting the angle difference data to the electronic apparatus.

13. The system operation method of claim 12, wherein the connection base is configured to abut the electronic apparatus with an abutting surface, the keyboard device further comprises an electrical connector, the electrical connector is disposed on the connection base, partially exposed from the abutting surface, and electrically connected to the processor, and the step of driving the processor to calculate the angle difference data according to the first tilt data and the second tilt data comprises:

driving the processor to calculate the angle difference data when the electrical connector receives an electrical signal from the electronic apparatus.

14. The system operation method of claim 13, wherein the keyboard device further comprises a Hall effect sensor, the Hall effect sensor is disposed on the connection base and electrically connected to the processor, and the step of driving the processor to calculate the angle difference data according to the first tilt data and the second tilt data comprises:

driving the processor to calculate the angle difference data when the electrical connector and the Hall effect sensor respectively receive an electrical signal and a magnetic signal.

15. The system operation method of claim 12, further comprising the step of:

driving the electronic apparatus to determine whether to operate based on the input signal according to the angle difference data.

16. The system operation method of claim 12, wherein the matrix scanning circuit is disposed on the main body and electrically connected to the processor, and the step of driving the matrix scanning circuit to perform the scanning operation comprises:

driving the processor to determine whether to drive the matrix scanning circuit to perform a scanning operation according to the angle difference data.

17. The system operation method of claim 12, wherein the predetermined range is ranged from 150 degrees to 165 degrees.

18. The system operation method of claim 12, wherein the group comprises a windows key, a blank key, and function keys.

* * * * *